Nov. 5, 1968  A. B. KENNEDY, JR  3,409,126
DRY PRODUCT RECLAIMING APPARATUS
Filed March 14, 1966
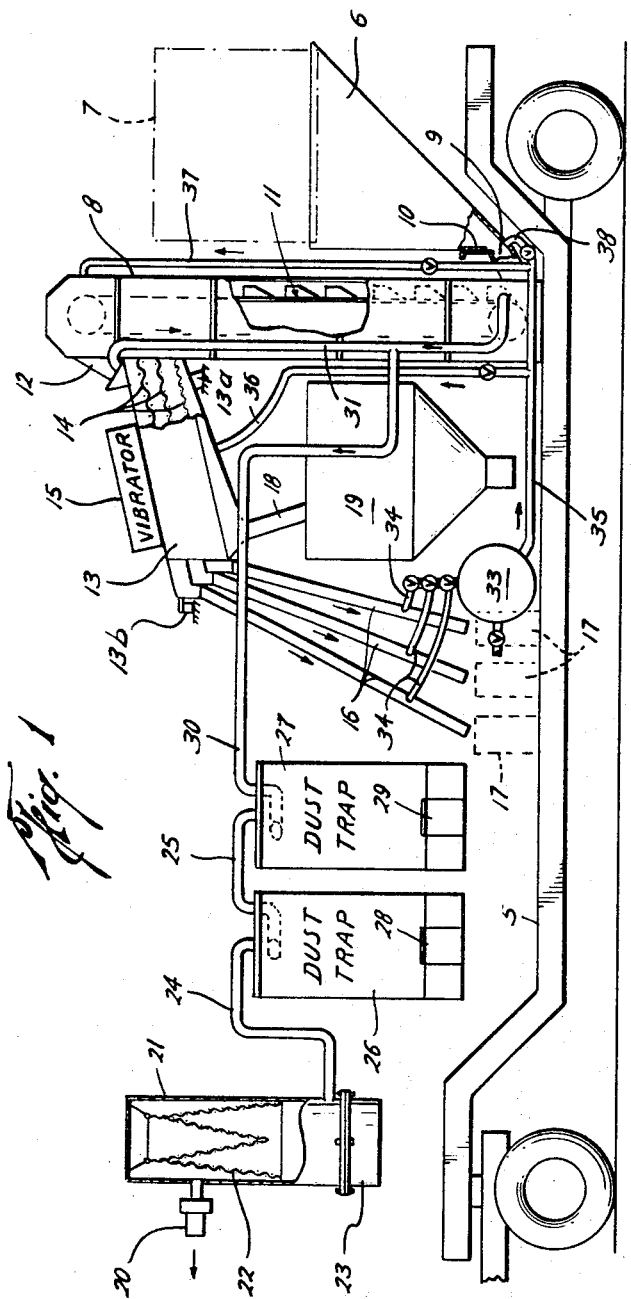
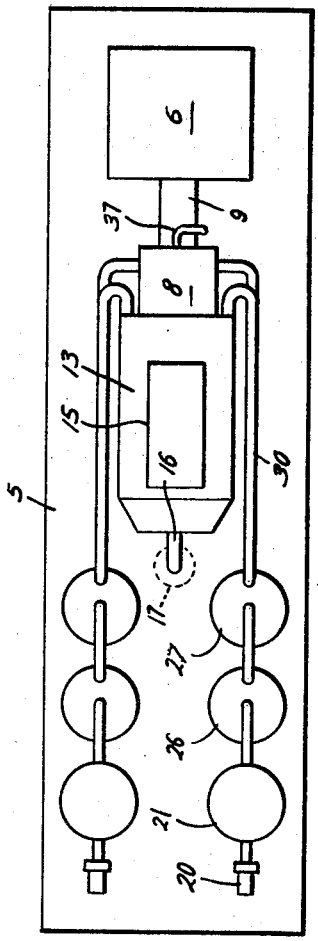
Alvin B. Kennedy, Jr.
INVENTOR.
BY Bertram K. Mann
ATTORNEY

United States Patent Office 3,409,126
Patented Nov. 5, 1968

3,409,126
DRY PRODUCT RECLAIMING APPARATUS
Alvin B. Kennedy, Jr., 1802 Meadowview,
Alvin, Tex. 77511
Filed Mar. 14, 1966, Ser. No. 533,966
2 Claims. (Cl. 209—12)

ABSTRACT OF THE DISCLOSURE

A machine for salvaging, particulate material including agitator and fluid flow means for classifying the material according to particle size and dust fine particle collection means at various points in the apparatus.

This invention relates to dry product reclaiming apparatus and consists particularly in means capable of fully reclaiming granulated product, such as used catalyzer, while separating the same into its consitituents of various degrees of fineness for further use or disposal as desired.

Many chemical plants have need of a granular catalyst through which reacting material, for instance, gas, is passed. The catalyst is not consumed or expended in the process. However, in the case of dry material some agitation thereof occurs and therefore produces dust and/or broken granules or chips. Ultimately, such dust and chips create production problems by causing the reactant flow to be uneven or channeled through the reactor so that ultimately the reactor must be shut down for removal and replacement of the catalyst. Since frequently the catalyst is expensive, it is desirable to salvage as much as possible thereof as well as to reduce as far as possible the down time of the reactor.

Catalyst salvaging operations therefore frequently have created a health hazard and some loss of catalyst by simply blowing the dust constituents into the atmosphere. Furthermore, it has been customary simply to ship the used catalyst product to a reclaiming plant at some distant point requiring the installation of fresh catalyst for immediate restarting of the reactor or an extended down time during the salvaging operation.

Accordingly, an object of the present invention is to provide apparatus which will effect complete salvage of the used catalyst including separation of fines and broken particles from pieces of preferred usable size.

Another object is to provide an apparatus for salvaging dry product, such as used catalyst, including separation of the dust ingredients therefrom without polluting the atmosphere.

Another object is to provide for salvage of granular, dry product without further damage thereto.

Still another object is to provide for salvage of granular product including the release and collection of the fine ingredients while maintaining the product free of damaging atmosphere and/or moisture.

These objects and others hereafter appearing are attained substantially by the novel salvaging apparatus herein described which consists in general of first and second housings or enclosures containing, respectively, a product conveyor and vibrator type separating means. A feed chute for product to be reclaimed is connected through a spillway to one end of the first housing and the first and second housings are also connected by a spillway. In addition, spillway means connect the separator with classifying receptacles. Where dry product is to be salvaged, all of the points of agitation, particularly at the connections between the chute and conveyor housing and adjacent the spillways, are subjected to a gaseous flow for picking up the released dust which is then separated from the flow and itself collected. The agitating points may be subjected to a flow of inert gas which protects the catalyst from damaging air and/or moisture.

Preferably, the flow of fluid at agitating points, for instance, as the particulate material is dumped on the conveyor buckets or on the separator screens or at other points, is opposite to the direction of flow of the particulate material so as to impede the velocity of the particles and soften their impact. This tends to protect the particles against further breakage or dusting.

In the accompanying drawing,
FIG. 1 is a largely diagrammatic elevation and section of apparatus embodying the invention; and
FIG. 2 is a top view of the apparatus in FIG. 1.

The entire apparatus is mounted for portability upon a wheeled truck chassis 5. At the right-hand end of the chassis there is mounted an inlet hopper or feed bin 6 into which the dry product to be reclaimed may be dumped or upon which there may be mounted a transport container, as at 7, if it is desired to provide a substantially closed system to protect the product as far as possible from the atmosphere. Adjacent the chute there is provided an upright first housing 8 connected at its bottom to chute 6 by means of a spillway 9. A gate valve 10 controls access to the spillway. Within housing 8 there is mounted a belt conveyor, generally designated 11, which picks up product delivered through spillway 9 and transports it upwardly, thence discharges the product through a second spillway 12 into a second housing or enclosure 13. Within housing or enclosure 13 are stacked screens 14 of graduated fineness, and the entire separator comprised of parts 13 and 14 is provided with suitable mounts 13a and 13b and may be agitated by means conventionally designated 15 for enforcing separation according to size. Delivery spillways 16 lead from the left-hand side of separator housing 13 for conveying the classified product to collection receptacles 17. Chips and other unwanted fines drop through pipe 18 into a collection hopper 19.

A source of suction, such as a pump 20, is connected to a first dust separator device 21 having a screen 22 and a removable bottom 23 for recovery of the collected dust. Separator 21 is connected by piping 24 and 25, in series, to first and second dust traps 26 and 27 of any known type having suitable gates at the bottom, as at 28 and 29, for removal of dust. Trap 27 is connected by a suction line 30 to the mid portion of a pipe 31 which opens into spillway 12 between housings 8 and 13 and into the lower portion of housing 8 adjacent spillway 9.

A tank 33 for air or other gas under superatmospheric pressure is connected by branch pipes 34 with outwardly opening check valves to each of delivery ducts 16 near the lower extremities thereof. The tank is also connected by piping 35, 36 to the under side of separator housing 13 and piping 35, 37 to the upper part of conveyor housing 8. Piping 35 also leads through a short section of piping 38 into delivery chute 9. FIG 2 is a schematic top view of the apparatus showing the dust separating and collecting means doubled for greater capacity.

In operation, the dry mixture to be salvaged is placed in inlet hopper or bin 6. Then with gate 10 open, conveyor 11 is started to conduct the material upwardly through housing 8 and to dump it through spillway 12 into separator housing 13 from whence the classified solid material is directed through ducts 16 to collection receptacles 17 or into waste hopper 19. Spillways 9 and 12 and ducts 16, as well as vibrating screens 14, are inclined at angles somewhat greater than the angle of repose of the material being treated, but not steep enough to cause the material to tumble or fall with possible danger of further breaking the pellets.

Spillways 9 and 12, vibrator screens 14, and delivery ducts 16 all constitute agitating points which tend to release adherent dust from the mixture products being treated. The suction apparatus stimulates a forceful flow or blast of gaseous material upwardly through separator 13 and spillway 12 and also through spillway 9. The rate of flowage of the dust-collecting gas may be increased by the provision of the pressured gas system including tank 33 and its connected piping. If desired, tank 33 may be charged with an inert gas, such as nitrogen, which will protectively blanket the product for excluding air and moisture therefrom, as is frequently desirable in the case of catalysts which must be kept free of moisture. It is noted that the fluid flow from pipe 36 through feed chutes 16, housing 13, and spillway 12 is counter to the direction of movement to the direction of movement of the particulate material therein. Consequently, the movement of the latter material, particularly in striking the screens and collecting containers 17, is impeded as a protective measure.

The apparatus, of course, can be transported as a unit to and throughout a plant. Accordingly, the down time may be reduced to a minimum, in the case of salvaged catalyst, by promptly returning the catalyst to its supporting beds. The complete salvage job may be performed in a very efficient manner, which a careful accounting may be kept of all treated dry product, including dust which, previously, has been mostly wasted. The invention may be modified in various respects as will occur to those skilled in the art, and the exclusive use of all modifications as come within the scope of the appended claims is contemplated.

I claim.

1. Reclaiming apparatus for particulate product bearing adherent dust comprising housing means, a feed bin for product to be reclaimed, product separating means in said housing, spaced apart spillways positioned to direct product, respectively, from said bin into said housing and into said separator, a conveyor connecting said spillways, a suction pump, a source of superatmospheric pressure, dust collection means, and connection from said source to said collection means, said housing adjacent said spillways, said separator, and said pump for causing forceful gaseous flow in contact with the product at points of agitation thereof and for removing and recovering dust adhering thereto.

2. Particulate product reclaiming apparatus as described in claim 1 in which gaseous flow from said reservoir passes through at least one of said spillways in opposition to the movement of product therethrough for retarding such movement.

References Cited

UNITED STATES PATENTS

| 1,675,707 | 7/1928 | Mull | 209—247 X |
| 1,793,098 | 2/1931 | Kramer | 209—133 X |
| 2,076,523 | 4/1937 | Ballack | 209—22 X |
| 2,452,362 | 10/1948 | Erisman | 209—28 X |
| 2,595,226 | 5/1952 | Cookson | 209—22 X |
| 2,623,634 | 12/1952 | Kuss | 209—27 |
| 2,713,977 | 7/1955 | Noll | 209—250 X |

FOREIGN PATENTS

| 1,134,572 | 8/1962 | Germany. |

HARRY B. THORNTON, *Primary Examiner.*

ROBERT HALPER, *Assistant Examiner.*